US011327984B2

(12) United States Patent
Raviv et al.

(10) Patent No.: US 11,327,984 B2
(45) Date of Patent: May 10, 2022

(54) COMPUTERIZED SYSTEMS AND METHODS FOR QUERY EXPANSION USING DISPLAYED OBJECTS

(71) Applicant: Yahoo Holdings, Inc., Sunnyvale, CA (US)

(72) Inventors: Ariel Raviv, Haifa (IL); Sofia Tolmach, Haifi (IL)

(73) Assignee: YAHOO ASSETS LLC, Dulles, VA (US)

( * ) Notice: Subject to any disclaimer, the term of this patent is extended or adjusted under 35 U.S.C. 154(b) by 254 days.

(21) Appl. No.: 15/798,490

(22) Filed: Oct. 31, 2017

(65) Prior Publication Data

US 2019/0130006 A1 May 2, 2019

(51) Int. Cl.
| | |
|---|---|
| *G06F 16/00* | (2019.01) |
| *G06F 16/248* | (2019.01) |
| *G06F 3/0486* | (2013.01) |
| *G06F 16/242* | (2019.01) |
| *G06F 16/332* | (2019.01) |
| *G06F 16/9032* | (2019.01) |
| *G06F 16/26* | (2019.01) |
| *G06F 16/33* | (2019.01) |
| *G06F 3/04817* | (2022.01) |
| *G06F 3/0482* | (2013.01) |

(52) U.S. Cl.
CPC .......... *G06F 16/248* (2019.01); *G06F 3/0486* (2013.01); *G06F 16/2428* (2019.01); *G06F 16/26* (2019.01); *G06F 16/3325* (2019.01); *G06F 16/3338* (2019.01); *G06F 16/9032* (2019.01); *G06F 3/0482* (2013.01); *G06F 3/04817* (2013.01)

(58) Field of Classification Search
CPC .... G06F 16/26; G06F 16/3338; G06F 16/248; G06F 16/3325; G06F 16/9032; G06F 16/2428; G06F 3/0486; G06F 3/04817; G06F 3/0482
See application file for complete search history.

(56) References Cited

U.S. PATENT DOCUMENTS 7,665,028 B2 * 2/2010 Cummins ............. G06F 3/0486
715/769
7,747,966 B2 * 6/2010 Leukart ................ G06Q 10/109
715/792

(Continued)

OTHER PUBLICATIONS

Yeh et al., "Sikuli: Using GUI Screenshots for Search and Automation", 2009, ACM. (Year: 2009).*

*Primary Examiner* — Ajith Jacob
(74) *Attorney, Agent, or Firm* — Cooper Legal Group, LLC

(57) ABSTRACT

One or more computing devices, systems, and/or methods for query expansion are provided. For example, a search user interface is populated with search results of a query submitted through a computing device. User input is received through the search user interface for an object, such as a drag and drop command of a phrase occurring within the search results. The user input may drag the phrase from a search result to a query input user interface. In this way, the query is modified based upon the object, such as where the phrase is added to the query to create a modified query. Second search results for the modified query are displayed through the search user interface.

20 Claims, 17 Drawing Sheets

(56) References Cited

U.S. PATENT DOCUMENTS

| | | | | |
|---|---|---|---|---|
| 2004/0255237 | A1* | 12/2004 | Tong | G06F 16/951 |
| | | | | 715/232 |
| 2007/0157129 | A1* | 7/2007 | Facemire | G06F 16/248 |
| 2007/0185884 | A1* | 8/2007 | Kantamneni | G06F 16/958 |
| 2007/0192314 | A1* | 8/2007 | Heggem | G06Q 30/02 |
| 2008/0033919 | A1* | 2/2008 | Arrouye | G06F 16/907 |
| 2010/0122195 | A1* | 5/2010 | Hwang | G06F 3/0488 |
| | | | | 715/769 |
| 2010/0287161 | A1* | 11/2010 | Naqvi | G06K 9/00771 |
| | | | | 707/740 |
| 2010/0312782 | A1* | 12/2010 | Li | G06F 16/9038 |
| | | | | 707/769 |
| 2011/0078173 | A1* | 3/2011 | Seligmann | G06Q 10/10 |
| | | | | 707/769 |
| 2014/0143243 | A1* | 5/2014 | Kim | G06F 16/2457 |
| | | | | 707/728 |
| 2015/0058318 | A1* | 2/2015 | Blackwell | G06F 3/04817 |
| | | | | 707/722 |
| 2017/0024662 | A1* | 1/2017 | Warn | G06N 3/0445 |

* cited by examiner

COMPUTERIZED SYSTEMS AND METHODS FOR QUERY EXPANSION USING DISPLAYED OBJECTS

BACKGROUND

Many content sources provide search functionality so that users can more efficiently locate content. In an example, a search engine allows users to search for websites, images, and/or other content available from content sources accessible over a computer network. In another example, a social network application allows users to search for social network user profiles, social network posts, social network groups, and/or other content of a social network. In other examples, file systems, email applications, and/or other services and applications may allow users to search for content.

Query assist tools may allow for query expansion and refinement. For example, a query assist tool may evaluate a query being typed by a user. The query assist tool may provide a list of autocomplete suggestions from which the user can select an autocomplete suggestion for augmenting, refining, and/or completing the query for submission to a search tool. Unfortunately, the small form factor of mobile device displays such as wearable devices, mobile phones, tablets, smart watches, smart glasses, etc. makes it difficult or impractical to provide query suggestions. In particular, merely a few query suggestions may be able to fit within a user interface being displayed by a mobile device. Furthermore, those query suggestions may overlap content being viewed by the user, thus disrupting the user's ability to view content within the user interface that could otherwise provide the user with valuable context for formulating the query. Also, the display size of such devices is an obstacle for performing input tasks such as typing on a touch keyboard to input the query, which can be slow and error prone, thus resulting in unwanted input results.

SUMMARY

In accordance with the present disclosure, one or more computing devices and/or methods for query expansion are provided. In one embodiment, a search user interface may be populated with search results of a query. User input is received through the search user interface. The user input corresponds to an object rendered through a display. The object may comprise text, an image, a calendar entry, a social network avatar, a file, a hyperlink, an email, an attachment, and/or other computing objects or user interface elements. The input may correspond to the user dragging the object from a current display location and dropping the object over or in proximity to a query input user interface. In one example, the object is part of a search result within the search user interface, such as text from a title or description of the search result. In another example, the object is part of content within a user interface separate from the search user interface, such as a calendar entry from a calendar user interface.

In response to the user input, the query is modified using the object to create a modified query. For example, if the user dragged and dropped the phrase "metal" within a search result description to the query input user interface, then the phrase "metal" is added to a query "cage" within the query input user interface. In this way, second search results for the modified query are provided, such as search results for "metal cage".

In another embodiment, a query is received. Search results for the query are obtained. The search results are evaluated to identify candidate query objects within the search results, such as phrases, images, and/or other content that may be useful for augmenting, expanding, and/or completing the query. A visual format is applied to the candidate query objects to distinguish the candidate query objects from non-candidate query objects within the search results. For example, phrases that are candidate query objects are highlighted, bolded, underlined, or otherwise visually distinguished from other phrases within the search results. The search results are rendered within the search user interface. User input associated with a candidate query object may be received. For example, a user may drag a highlighted phrase "sports" from a search result description and drop the highlighted phrase "sports" over or in proximity to the query input user interface. In this way, a query "cars" may be modified using the highlighted phrase "sports" to create a modified query "sports cars". Search results for the modified query are provided, such as search results for "sports cars".

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
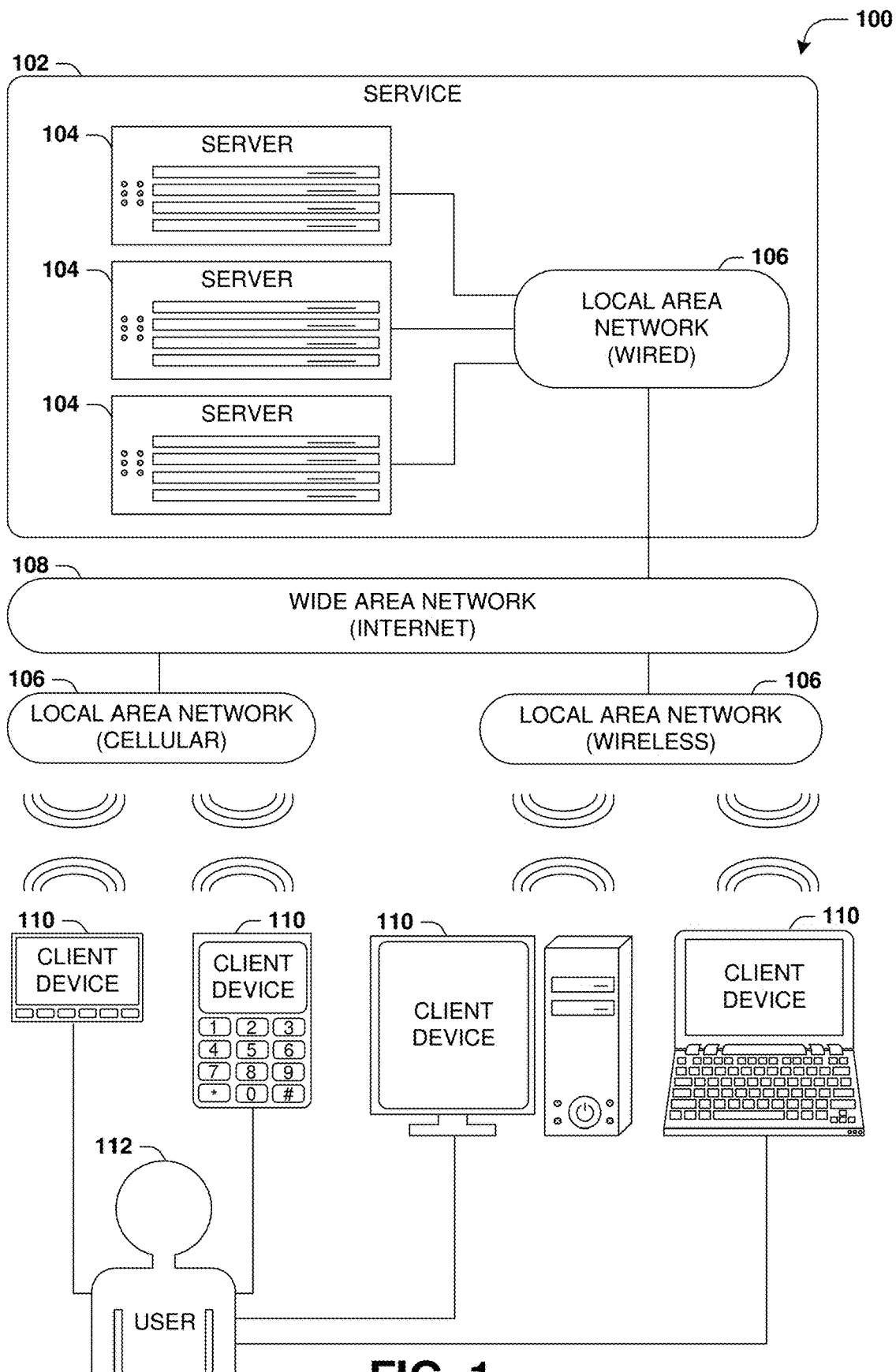
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
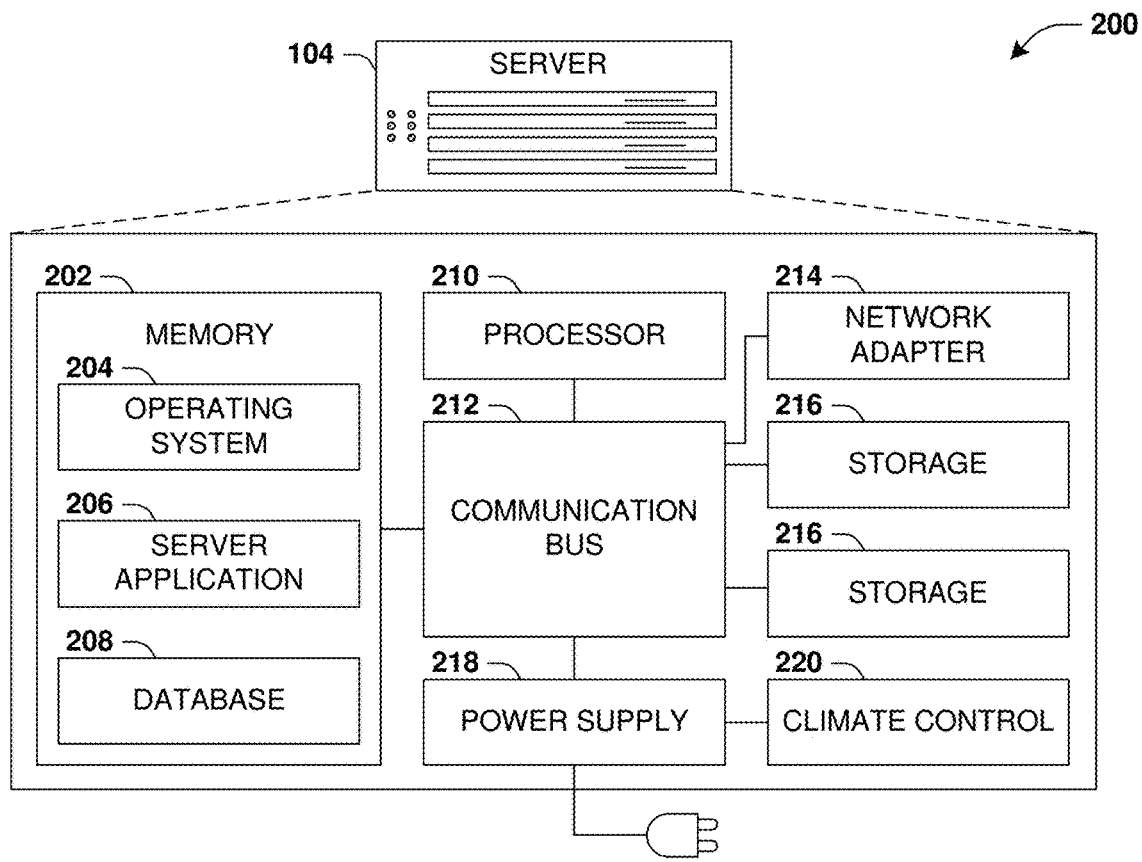
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
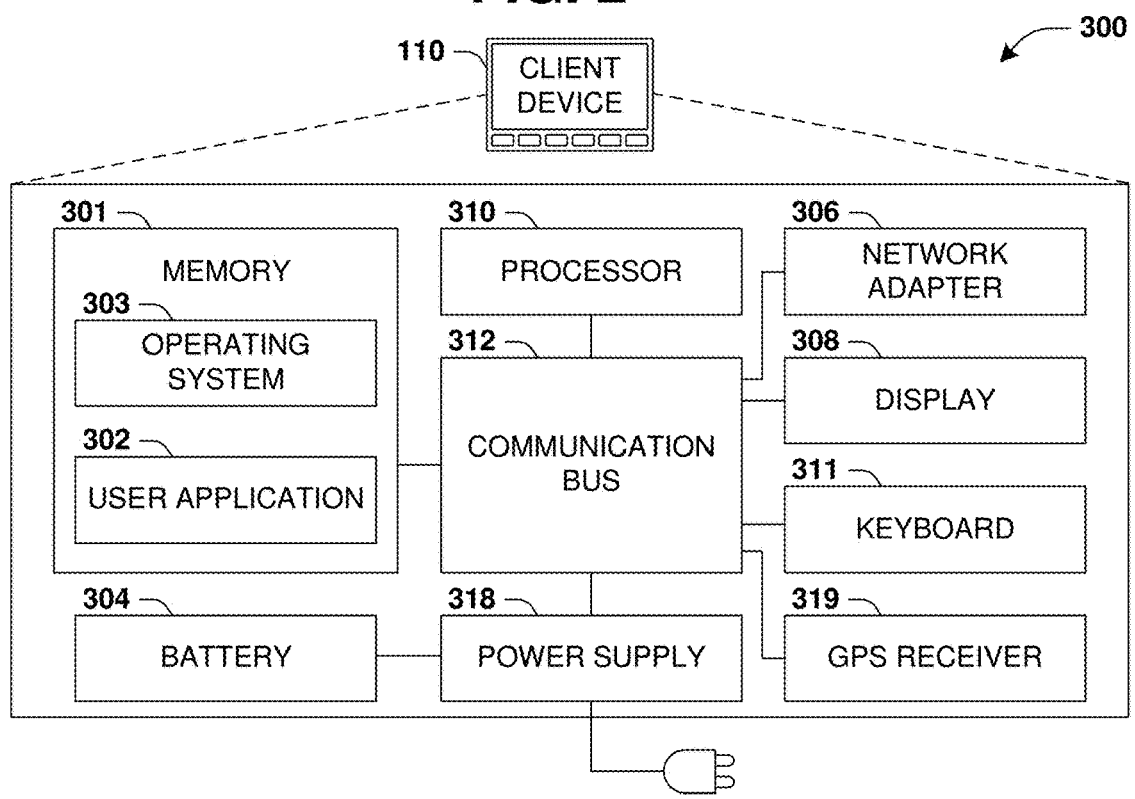
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for query expansion are provided. A query may be created and/or modified based upon user input associated with an object, such as text, an image, an icon, an email, a calendar entry, a file, etc. For example, drag and drop input can be performed to drag a phrase over a query input user interface in order to create a new query comprising the phrase or modify a current query within the query input user interface with the phrase. In this way, drag and drop input or other types of input can be used to create or modify a query by dragging and dropping objects over or proximate to the query input user interface.

This query expansion technique provides a technical solution to a technical problem relating to the constrained form factor of mobile device displays, such as tablets, phones, watches, glasses, wearable devices, etc. Conventional query suggestion techniques display query suggestions through a selectable list, which is not suitable for small displays because the selectable list will overlay and visually block content that the user is trying to view. Also, the selectable list is limited to a small number of query suggestions due to the limited display size. In contrast to consuming a relatively substantial amount of the display for presenting query suggestions, this query expansion technique allows a user to continue viewing content without overlaying, shrinking, or otherwise modifying the view of other content in a restrictive manner because such content may provide valuable context and information to the user such as for query formulation. Thus, the user can drag and drop objects into or proximate to the query input user interface in order to create a new query or modify an existing query within the query input user interface.

In an example, candidate query terms can be suggested to the user by highlighting objects within search results or other user interfaces currently being displayed to the user (e.g., a calendar entry may be highlighted within a calendar user interface based upon the calendar entry comprising content that may be a sub-topic of the query). This query expansion technique improves the ability of a user to create and/or modify existing queries in a manner that is non-disruptive. This query expansion technique also solves technical problems related to how users interface with user interfaces displayed on small form factor displays such as by typing on a touch keyboard, which can be slow and error prone, thus resulting to unwanted input results.

Figure 4:
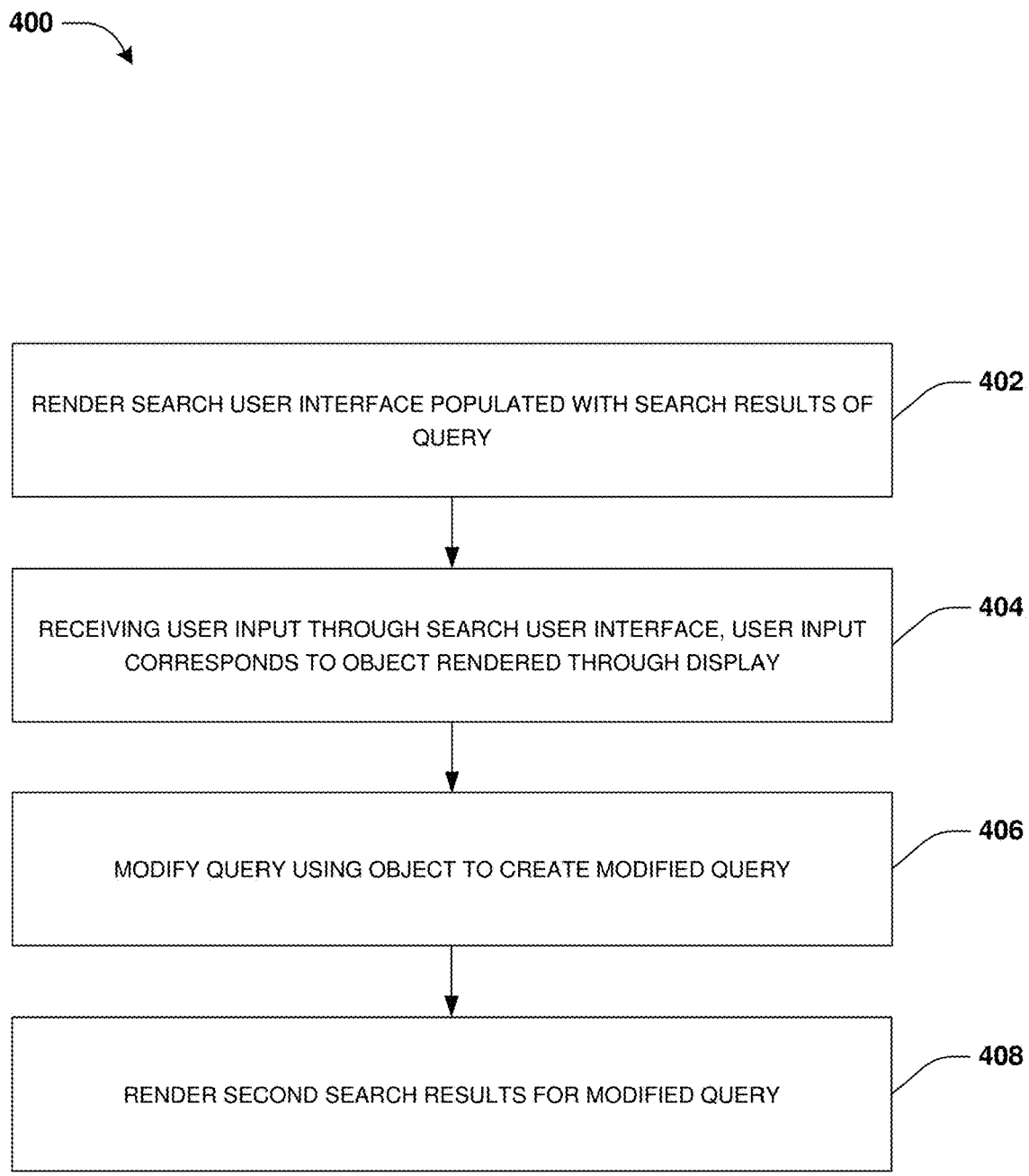
FIG. 4 is a flow chart illustrating an example method for query expansion.

An embodiment of query expansion is illustrated by an example method 400 of FIG. 4. At 402, a search user interface is rendered on a display of a computing device. The search user interface may be populated with search results of a query submitted through the computing device, such as a list of photos returned by a photo sharing service based upon a query "balloons". At 404, user input may be received through the computing device, such as a touch gesture (e.g., a drag and drop gesture), an eye gesture, mouse input (e.g., a single click, a double click, a drag and drop, etc.), a voice command, etc. It may be appreciated that a variety of different types of user input can be received, such as a long press, a double tap, and/or other gestures or input. The user input may be associated with an object rendered on a display of the computing device. The object may correspond to an object within the search user interface (e.g., text, an image, a hyperlink, or other object within a search result), an object within a user interface different than the search user interface (e.g., an email or email attachment within an email user interface, a calendar entry within a calendar user interface, a file within a file system user interface, a social network post within a social network interface, etc.), etc. In this way, the user input may be associated with a variety of different types of objects, such as icons, text, images, representations of social network users, email attachments, user contacts, calendar entries, map locations, social network posts, application data or user interface elements, files, user interface elements of a website, etc.

In one example, a drag and drop gesture is received. The drag and drop gesture may drag text, an image, or other object of a search result (e.g., text within a title or description of a photo search result, the photo of the photo search result, etc.) from the search result to a query input user interface. In another example, a drag and drop gesture of an object within the search user interface but not within a search result is received. The drag and drop gesture may drag a date, an icon, a user interface element, or any other data rendered through the search user interface to the query input user interface. In another example, a drag and drop gesture of an object within a different user interface, such as a calendar entry from a calendar application, is received. The drag and drop gesture may drag the calendar entry from the calendar application to the query input user interface. It may be appreciated that other types of user input can be used for query expansion, such as a touch and hold gesture, a press gesture, a certain type of mouse click, a gesture that results in display of a user interface populated with an option to add the object to a current query (e.g., a right mouse click), etc.

At 406, the query is modified using the object to create a modified query. In one example where the object is text, the query is modified by adding the text to the query to create the modified query. The text may be added to the query at a position corresponding to where a drag and drop command dropped the text, at a position before the query, a position after the query, or at a position determined by semantic analysis (e.g., the semantic analysis may determine that adding "sports" to "car" should results in "sports car" as opposed to "car sports"). In another example where the object is an image, a topic of the image may be determined by extracting the topic from metadata of the image or text proximate to the image (e.g., a title or description of a photo), by performing image feature recognition upon the image (e.g., features relating to a sports car may be extracted from the image to determine a "sports car" topic), etc. Thus, the topic may be added to the query.

In another example where the object is a calendar entry, text within the calendar entry can be evaluated (e.g., using semantic analysis, feature recognition functionality, topic extraction functionality, etc.) to determine a topic of the calendar entry. The topic may be added to the query. In another example where the object is a representation of a social network user (e.g., an avatar or icon representing a user of a social network), a name of the social network user may be added to the query. In another example where the object is an email, a subject line, a topic (e.g., determined using semantic analysis, feature recognition functionality, topic extraction functionality, etc.), a sender, a recipient, a date, an attachment (e.g., a name of a file), or other information relating to the email may be added to the query. In another example where the object is a link, the link may be used to access a destination of the link (e.g., a file at a file location, a website linked to by a hyperlink, a social network profile linked to by the link, etc.). Content of the destination may be added to the query (e.g., a name of the file, a title of the website, a topic of the website, a name or title of the social network profile, a description of an image linked to by the link, etc.). The query displayed in the query input user interface is updated with the modified query. If there is not query within the query input user interface, then a new query is created based upon the object.

At 408, second search results for the modified query are rendered through the search user interface. In one example, the user input, such as the drag and drop command, may trigger a search for the second search results using the modified query. In another example, the user input does not trigger the search, and thus the user may continue to refine the query before invoking a submit query command to perform the search. For example, second user input may be received for a second object (e.g., a mobile app icon). The modified query may be modified based upon the second object (e.g., a title of a mobile app represented by the mobile app icon may be added to the modified query). In this way, the query may be modified by various objects from various user interfaces before submission of the modified query.

Various other embodiments of query creation and expansion are contemplated. In one example, a user may drag and drop an object into a query input user interface to create a new query, such as where no query has been input into the query input user interface and/or where no search results have yet been provided to the user. In another example, a query that has not yet been submitted can be augmented based upon the user interacting with an object, such as where no search results have yet been provided to the user.

In another example, a query submitted through a computing device is identified. Search results for the query are obtained, such as websites, social network posts, emails, or other content corresponding to a query "vacations". The search results are evaluated to identify candidate query objects within the search results, such as text, images, icons, emails, social network posts, etc. In one example, candidate query objects are identified based upon prevalence of objects within the search results being within a first percentage of scored search results (e.g., phrases occurring within top ranked search results, thus indicative of phrases that are useful to suggest for augmenting the query) compared to prevalence of objects being within a second percentage of scored search results or within common text (e.g., phrases occurring with low ranked search results, thus indicative of phrases that are not useful to suggest for augmenting the query). In this way, objects that may be useful to suggest for augmenting the query are identified as candidate query objects.

In another example, candidate query objects are identified based upon co-occurrence of objects within the search results with the query. For example, the more a phrase and the query occur together within the search results, the more likely the phase would be useful to suggest for augmenting the query. In another example, the search results are clustered into clusters using various clustering algorithms (e.g., a Principle component analysis (PCA), a latent Dirichlet allocation (LDA) clustering method, a topic based clustering method that clusters search results having similar topics into the same cluster, etc.). The clusters are evaluated to assign ranks to objects within the search results of the clusters. In one example of assigning ranks, ranks are assigned based upon an amount an object represents a sub-topic or meaning of the query (e.g., the more the object represents the sub-topic or meaning, the higher the object is ranked). In another example of assigning ranks, the ranks are assigned based upon an amount an object differentiates from a sub-topic or meaning of other search results, which may be indicative of a uniqueness of the object for helping to further refine the query (e.g., the more the object differentiates from the sub-topic or meaning of other search results, the higher the object is ranked). In this way, candidate query objects are identified based upon the ranks, such as a selection of k highest ranked objects. Entropy, information gain, and/or other measures can be used for ranking and selecting objects.

A visual format is applied to the candidate query objects within the search results to visually distinguish the candidate query objects from non-candidate query objects within the search results. The candidate query objects may be highlighted, bolded, underlined, or have any other visual format applied to them. The search results, comprising the candidate query object having the visual format, are rendered within the search user interface. Responsive to receiving user input associated with a candidate query object, the query is modified using the candidate query object to create a modified query. Second search results are obtained and rendered for the modified query.

In one embodiment, the candidate query objects may be derived from content other than the search results, such as text, images, and/or user interface elements of user interfaces different than the search user interface. In this way, objects within other user interfaces such as text within a text document may be visually formatted as candidate query objects.

Figure 5A:
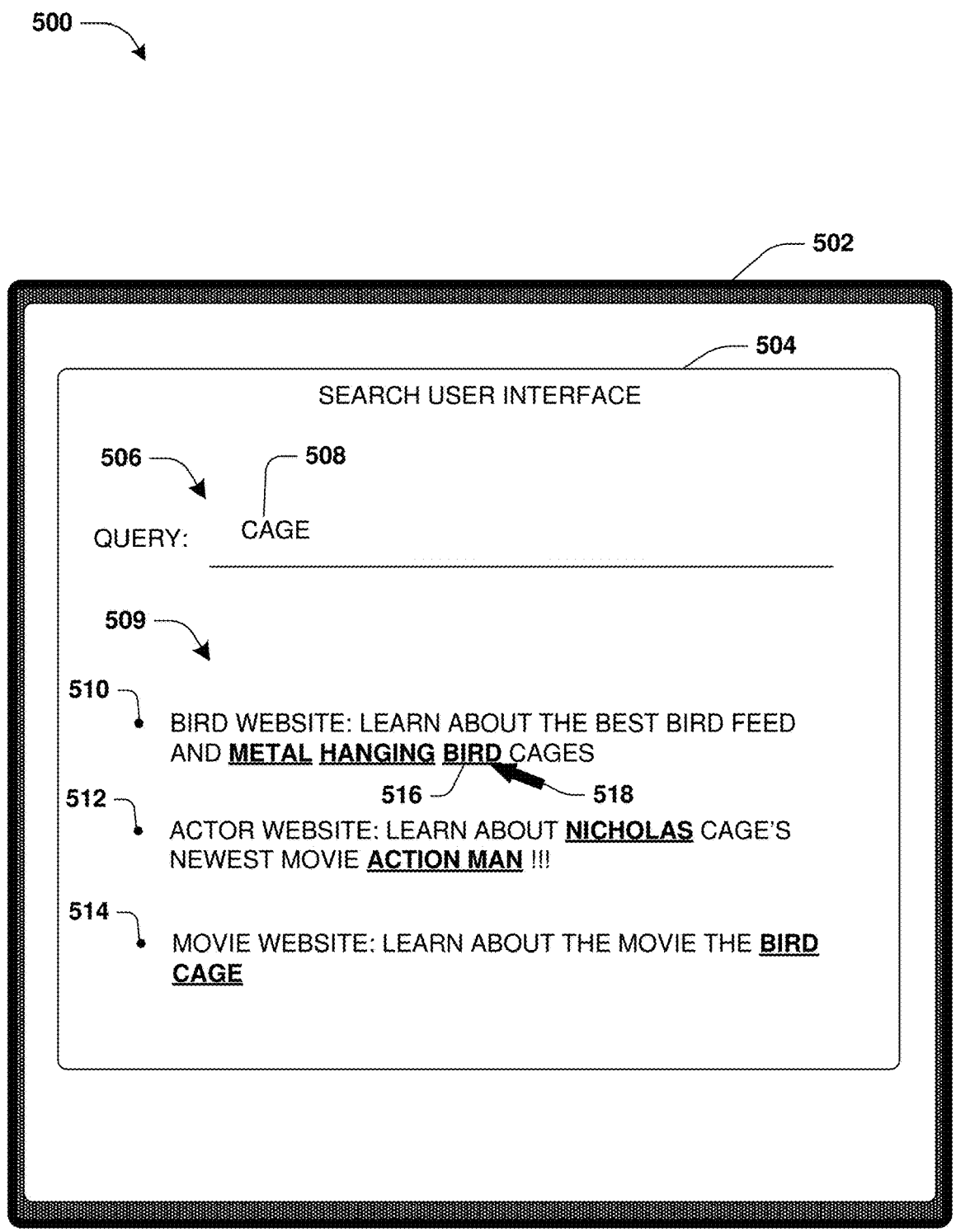
FIG. 5A is a component block diagram illustrating an example system for query expansion, where search results comprising candidate query objects are displayed.
Figure 5B:
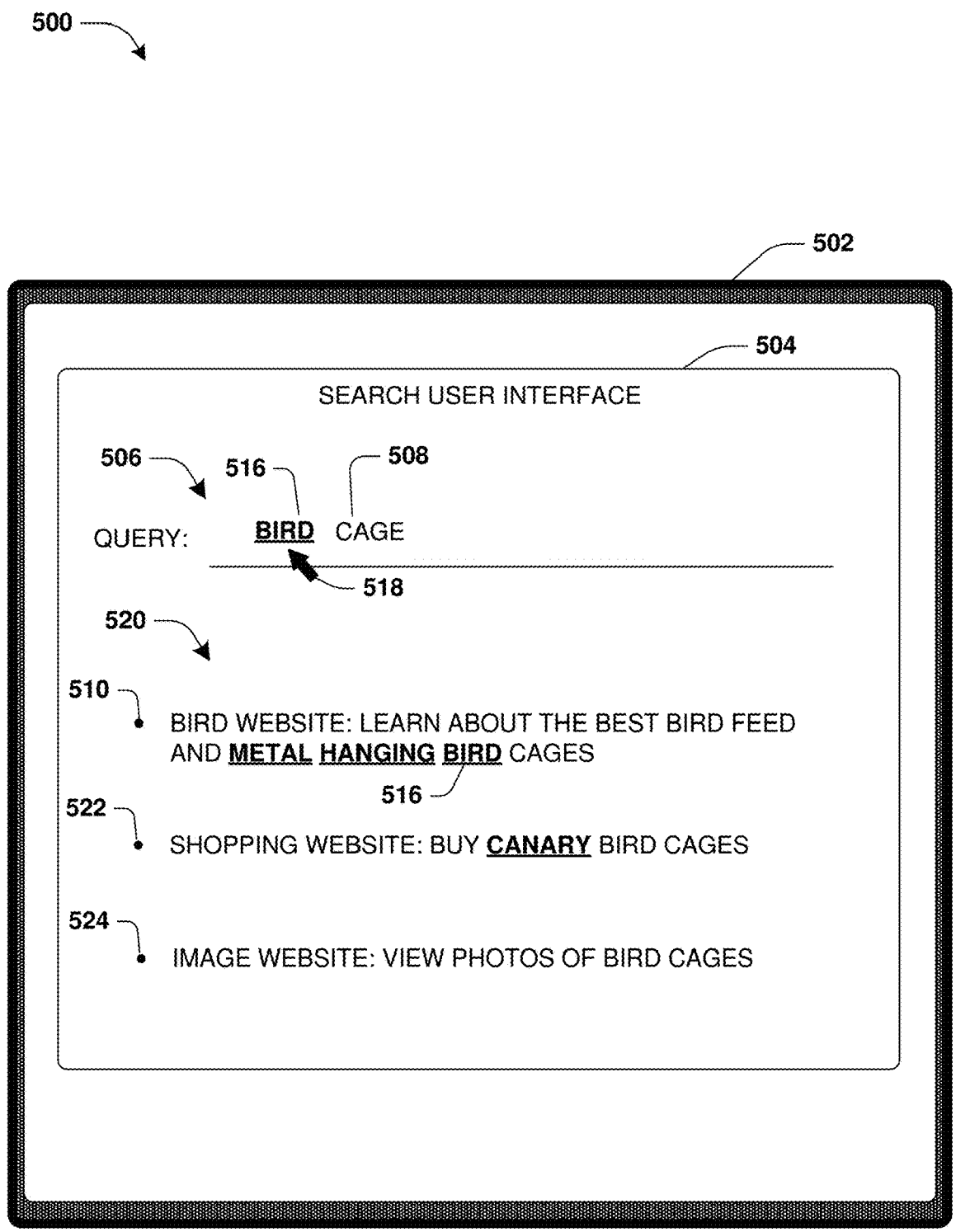
FIG. 5B is a component block diagram illustrating an example system for query expansion, where a query is modified using a candidate query object.

FIGS. 5A-5B illustrate an example of a system 500 for query expansion. FIG. 5A illustrates a computing device 502 rendering a search user interface 504. For example, a user may input a query "cage" 508 through a query input user interface 506. Search results 509 may be obtained for the query "cage" 508. The search results 509 may comprise a first search result 510 of a bird website, a second search result 512 of an actor website, a third search result 514 of a movie website, and/or other search results.

The search results 509 may be evaluated to identify candidate query terms that may be useful to suggest as candidates for modifying the query "cage" 508. It may be appreciated that a candidate query term may comprise any type of object, such as text, an image, a link, an attachment, an email, a calendar item, etc. For example, the description of the first search result 510 may be evaluated to identify "metal", "hanging", and "bird" 516 as candidate query terms, while the remaining terms within the first search result 510 are deemed to be non-candidate query terms. The description of the second search result 512 may be evaluated to identify "Nicholas" and "Action Man" as candidate query terms, while the remaining terms within the second search result 512 are deemed to be non-candidate query terms. The description of the third search result 514 may be evaluated to identify "Bird Cage" as a candidate query term, while the remaining terms within the third search result 514 are deemed to be non-candidate query terms The candidate query terms may represent a sub-topic or certain meaning of the query "cage" 508, represent a sub-topic or certain meaning that distinguishes from other search results, have a prevalence within top ranked search results compared to low ranked search results, and/or have high co-occurrence with the query "cage" 508. A visual format may be applied to the candidate query terms, such as a bold and underline format, to distinguish the candidate query terms from the non-candidate query terms.

The search results 509, comprising the candidate query terms having the visual format, are rendered on a display of the computing device 502 such as within the search user interface 504. In an example, a user may interface 518 with the candidate query term "bird" 516, such as by initiating a drag and drop command or any other input command.

FIG. 5B illustrates the user using the drag and drop command to drag the candidate query term "bird" 516 over or proximate to the query input user interface 506. For example, the user may use a touch gesture to drag the candidate query term "bird" 516 to a location within the query input user interface 506 before the query "cage" 508. Accordingly, the query "cage" 508 is modified with the candidate query term "bird" 516 to create a modified query "bird cage".

In one example, the user interfacing 518 with the candidate query term "bird" 516 may result in a new search being performed using the modified query "bird cage" (e.g., drag and dropping the candidate query term "bird" 516 may trigger the new search). In another example, the new search may be performed based upon the user submitting a submit query command. In this way, the new search is performed to obtain second search results 520 comprising the first search result 510, a fourth search result 522, and a fifth search result 524. Candidate query terms may be identified and visually formatted within the second search results 510. For example, candidate query terms may be identified within the first search result 510 and the fourth search result 522, but not the fifth search result 524. Thus, the user may continue to refine the modified query "bird cage" or may replace the modified query "bird cage" with a new query.

In an example of replacing a current query within the query input user interface 506, a user input for an object may be used to replace the current query within the query input user interface 506 with the object. In one example, user input may be a different type of interaction than the user input used to modify the current query, such as a press hold gesture, a double tap gesture, a mouse click gesture, or any other gesture that may differ from the drag and drop command or other user input used to trigger the modification of the current query. In another example, the same drag and drop command may be used to modify the current query or replace the current query, which may depend on a location of where the object is dropped (e.g., a modification is performed when the object is dropped before or after the current query within the query input user interface 506, whereas a replacement is performed when the object is dropped over or on top of the current query within the query input user interface 506).

Figure 6A:
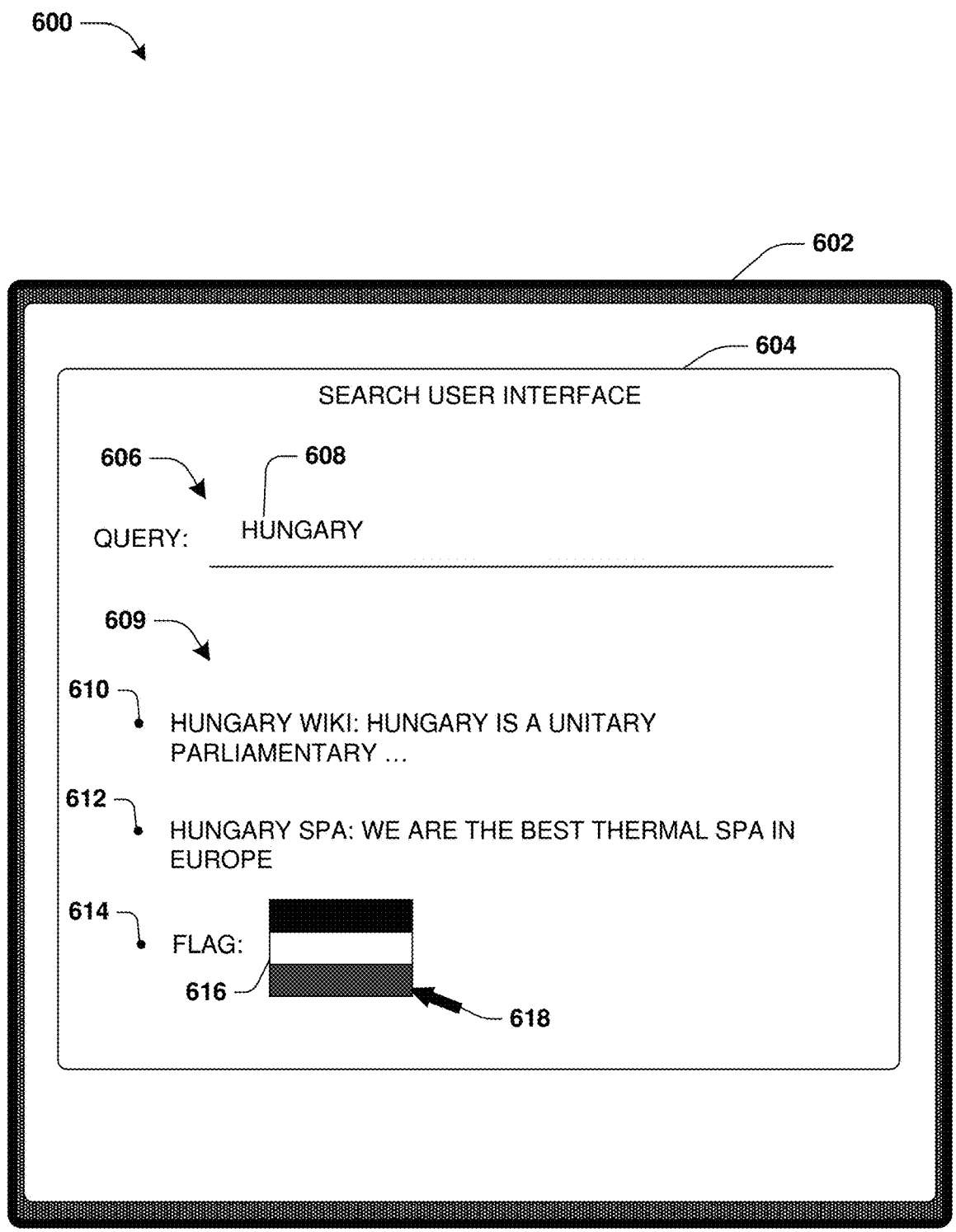
FIG. 6A is a component block diagram illustrating an example system for query expansion, where search results are displayed.
Figure 6B:
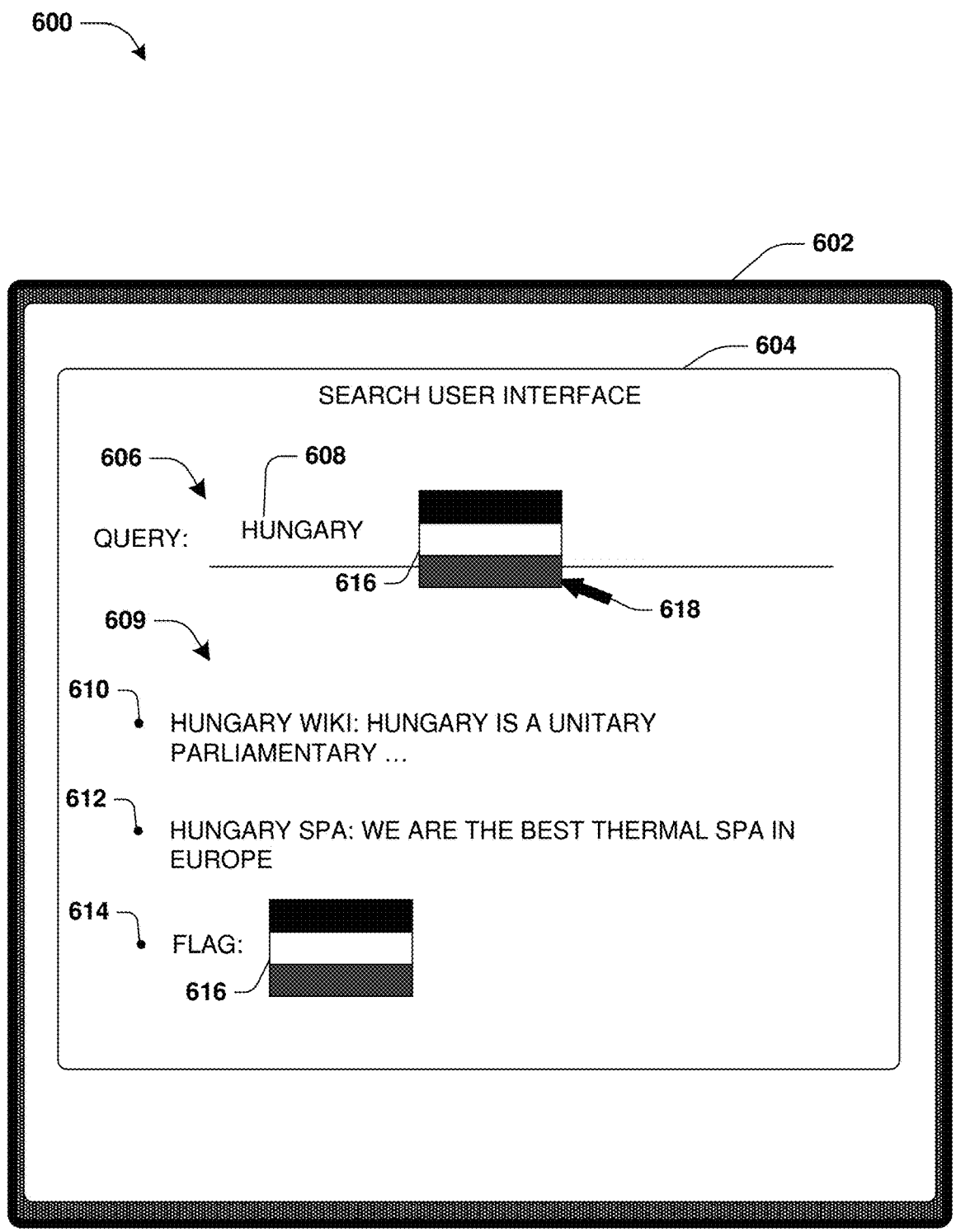
FIG. 6B is a component block diagram illustrating an example system for query expansion, where user input for an object is received.
Figure 6C:
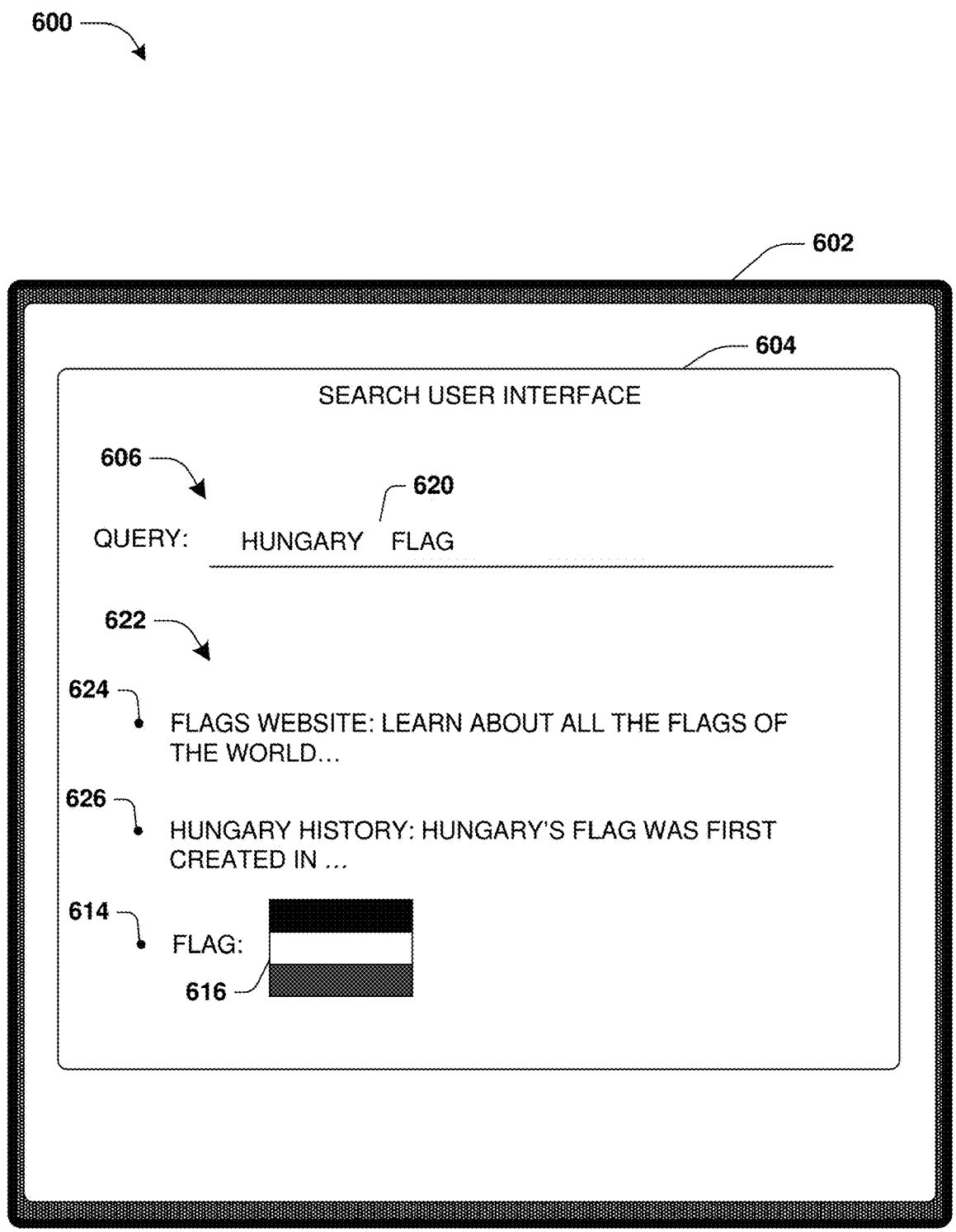
FIG. 6C is a component block diagram illustrating an example system for query expansion, where a query is modified using an object.

FIGS. 6A-6C illustrate an example of a system 600 for query expansion. FIG. 6A illustrates a computing device 602 rendering a search user interface 604. For example, a user may input a query "Hungary" 608 through a query input user interface 606. Search results 609 may be obtained for the query "Hungary" 608. The search results 609 may comprise a first search result 610 of a Hungary wiki website, a second search result 612 of a Hungary spa website, a third search result 614 of a flag image 616, and/or other search results. In one example, candidate query term identification is not performed upon the search results 609. Thus, the user may interface 618, such as by dragging and dropping, any text, image, user interface element, hyperlink, icon, or any other object for modifying or replacing the query "Hungary" 608 with the object.

FIG. 6B illustrates the user interfacing 618 with the flag image 616 by dragging and dropping the flag image 616 from the third search result 614 to a location within the query input user interface 606 that is after the query "Hungary" 608. Accordingly, the query "Hungary" 608 is modified with the flag image 616 (e.g., modified with a title "flag" of the flag image 616, which may be extracted from metadata of the flag image 616) to create a modified query "Hungary flag" 620, as illustrated by FIG. 6C. Second search results 622 comprising the third search result 614, a fourth search result 624, and a fifth search result 626 are obtained and rendered.

Figure 7A:
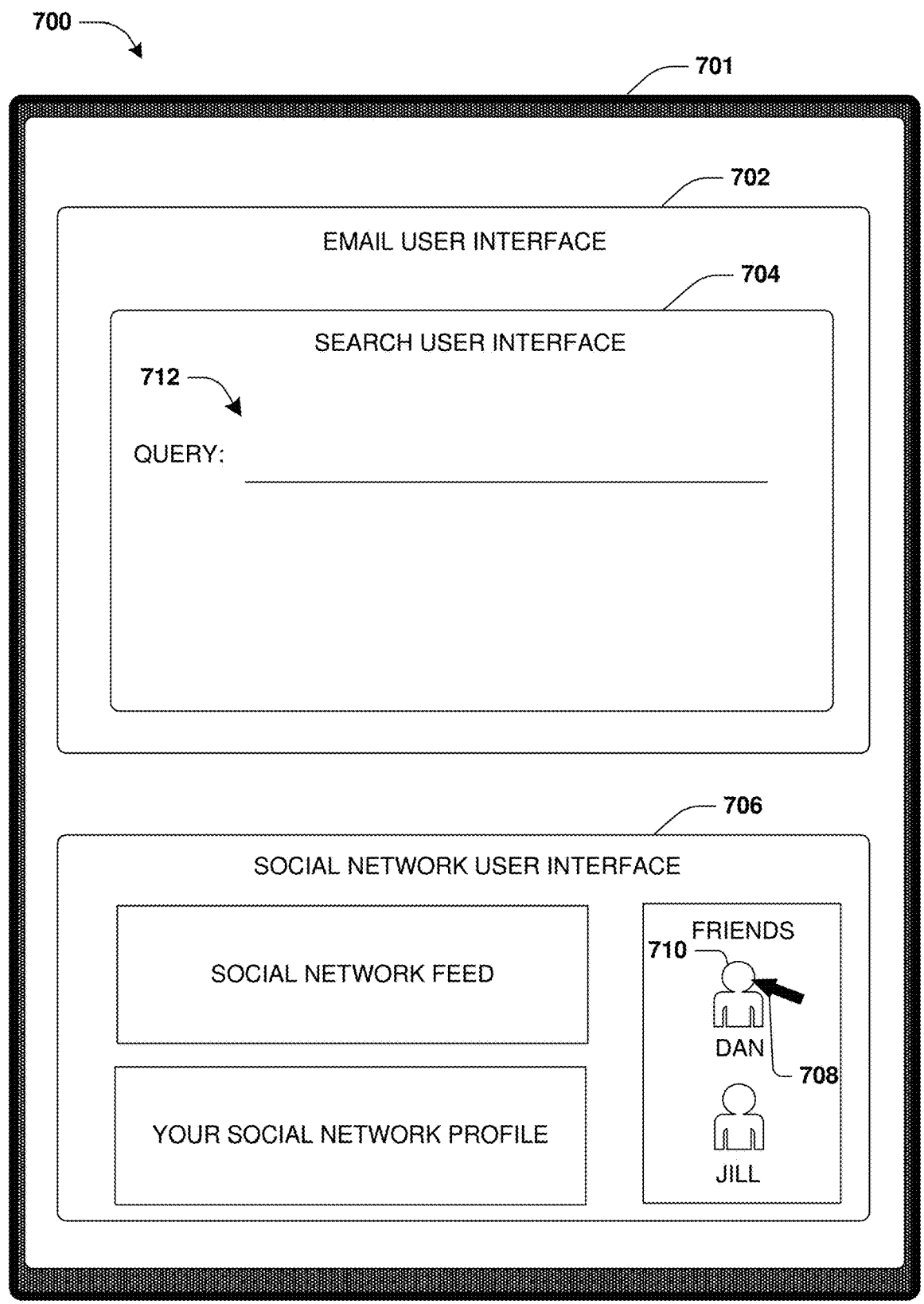
FIG. 7A is a component block diagram illustrating an example system for query expansion, where one or more user interfaces are displayed.
Figure 7B:
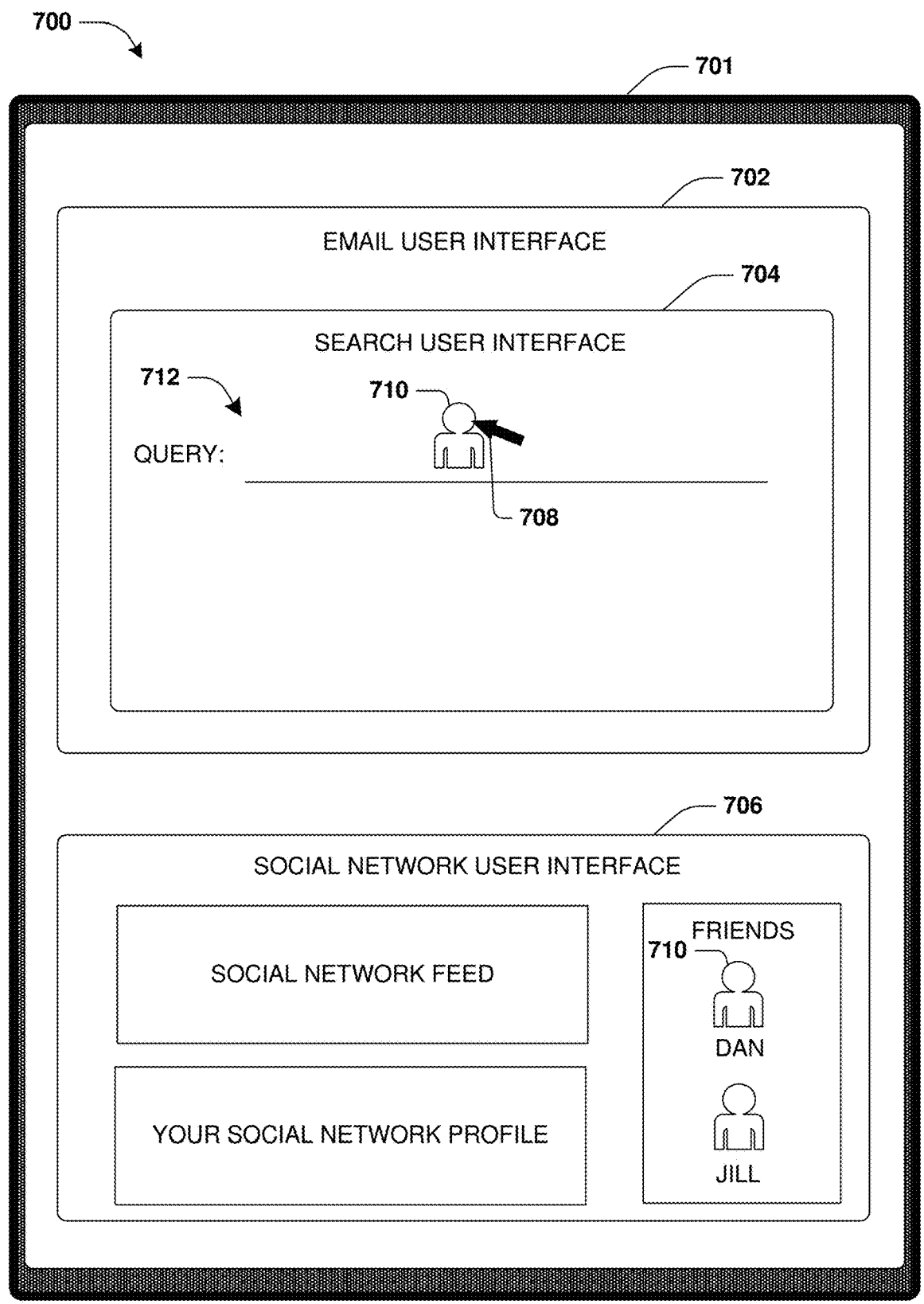
FIG. 7B is a component block diagram illustrating an example system for query expansion, where user input for an object is received.
Figure 7C:
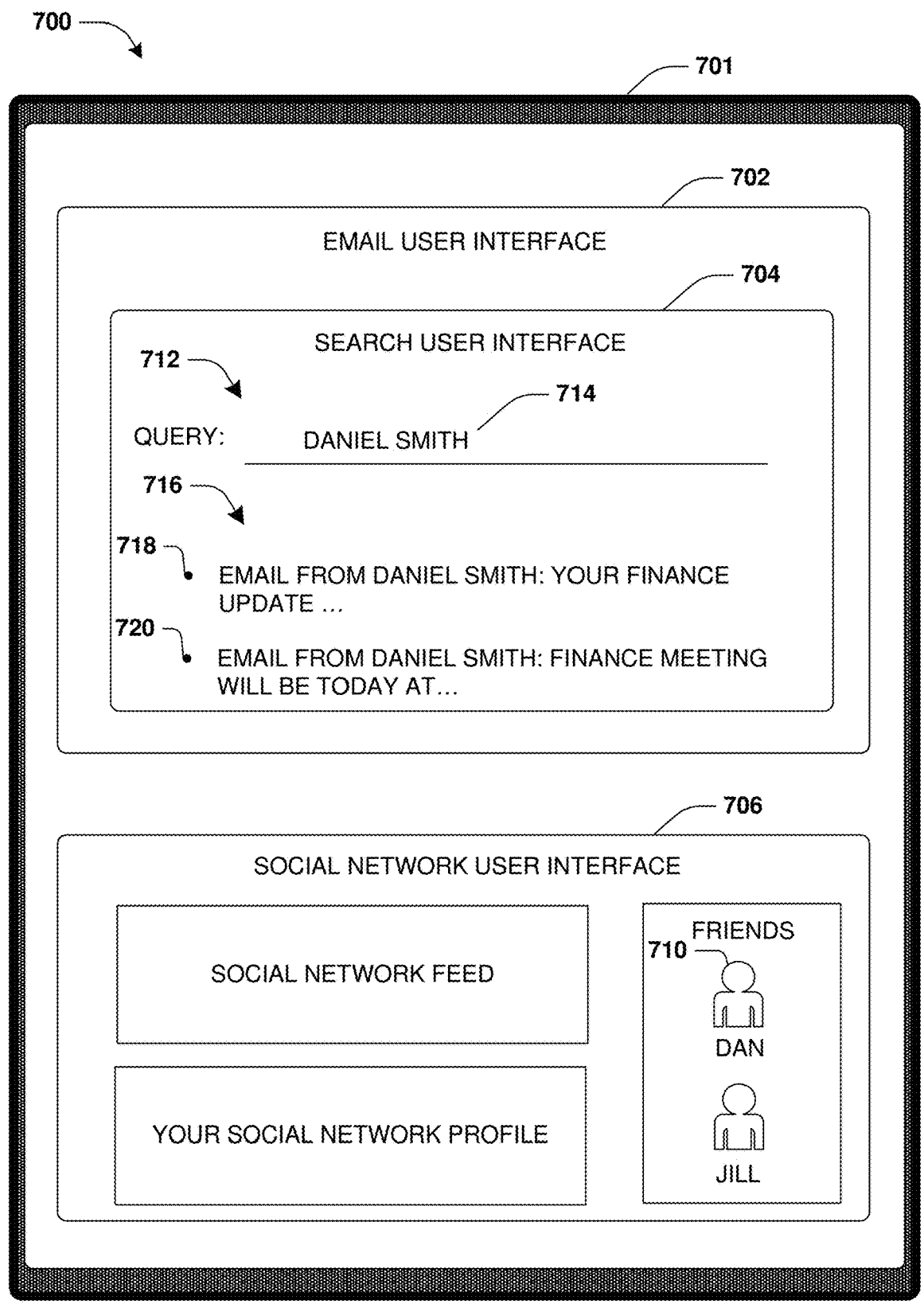
FIG. 7C is a component block diagram illustrating an example system for query expansion, where a query is modified using an object.

FIGS. 7A-7C illustrate an example of a system 700 for query expansion. FIG. 7A illustrates a computing device 701 rendering an email user interface 702 and a social network user interface 706. The social network user interface 706 may be populated with a social network feed, a social network profile of a user, a list of friends of the user, such as a representation of a social network user Dan 710. The email user interface 702 may be populated with a search user interface 704 through which the user can search for emails, tasks, calendar entries, and/or other data maintained by an email service provider. The search user interface 704 may comprise a query input user interface 712 through which the user can submit queries for performing searches.

In an example, the user may interface 708 with the representation of the social network user Dan 710 displayed within the social network user interface 706. The user may drag and drop the representation of the social network user Dan 710 over query input user interface 712 of the search user interface 704 within the email user interface 702, as illustrated by FIG. 7B. In response to the drag and drop, a new query "Daniel Smith" 714 is created and populated within the query input user interface 712, as illustrated by FIG. 7C. The new query "Daniel Smith" 714 may be created based upon a name of the social network user Dan. The name may be identified based upon text displayed near the representation of the social network user Dan 710 (e.g., user interface elements of the social network user interface 706 may be traversed and evaluated to identity text proximate to the representation of the social network user Dan 710), metadata associated with the representation of the social network user Dan 710, etc.

A search may be performed using the new query "Daniel Smith" 714 to obtain search results 716 that are rendered through the search user interface 704 of the email user interface 702. The search results 716 may comprise a first email 718 from Daniel Smith, a second email 720 from Daniel Smith, and/or other content relating to the new query "Daniel Smith" 714. In this way, objects (e.g., a user interface element comprising the representation of the social network user Dan 710) within the social network user interface 706 can be used to create new queries and/or modify current queries of the email user interface 702.

Figure 8A:
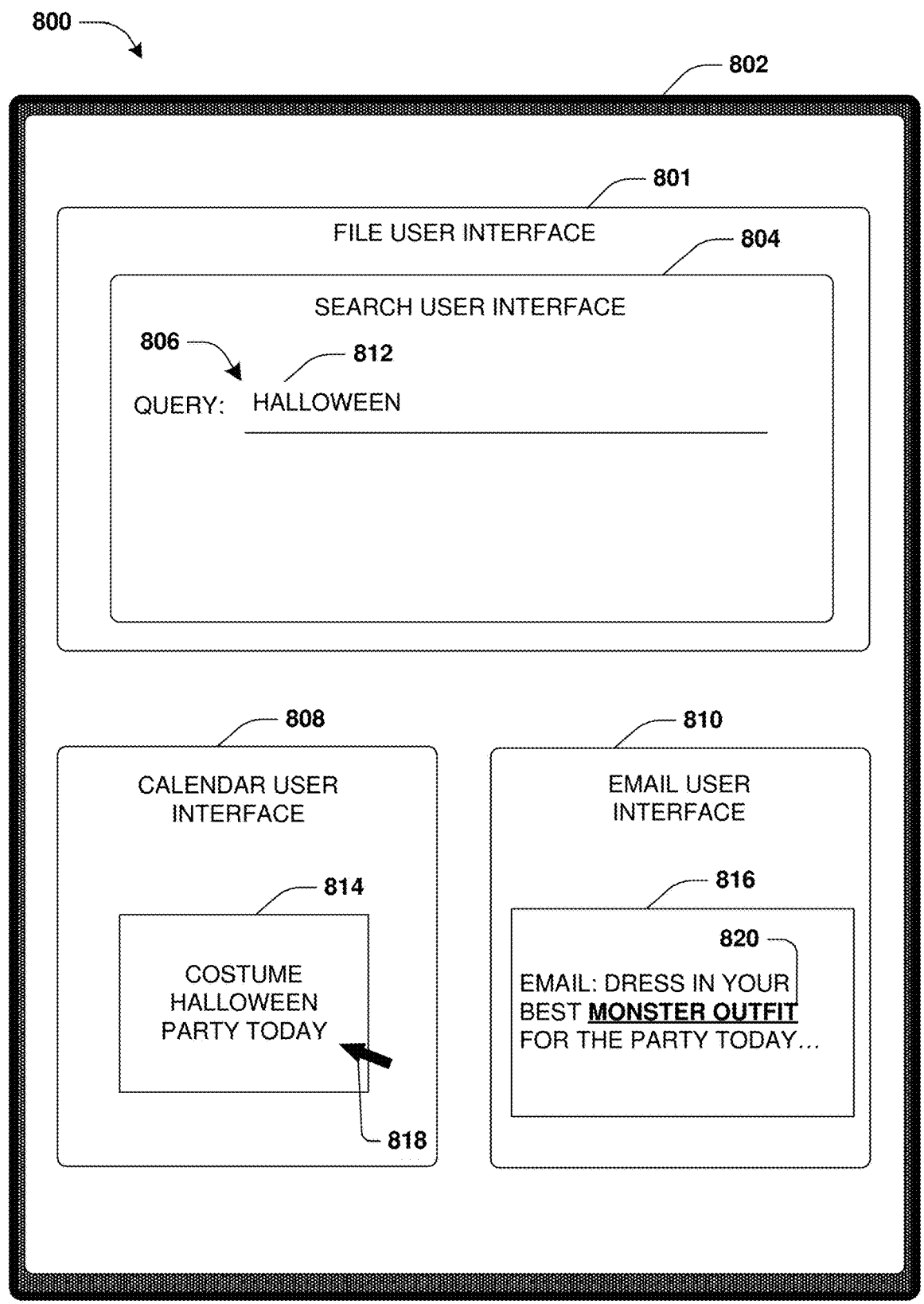
FIG. 8A is a component block diagram illustrating an example system for query expansion, where one or more user interfaces are displayed.

FIGS. 8A-8E illustrate an example of a system 800 for query expansion. FIG. 8A illustrates a computing device 802 rendering a file user interface 801 of a file system, a calendar user interface 808, and an email user interface 810. The file user interface 801 may be populated with a search user interface 804 through which a user can search for files of the file system. The search user interface 804 may comprise a query input user interface 806. The user may have input a query "Halloween" 812 into the query input user interface 806. In an example, the query "Halloween" 812 has not yet been submitted through the query input user interface 806 to perform a search.

The calendar user interface 808 comprise calendar entries, such as a costume Halloween party calendar entry 814. The email user interface 810 may be populated with emails, such as a Halloween party email 816. In one example, objects, such as the Halloween party email 816, within the various user interfaces (e.g., calendar entries, emails, etc.) are evaluated to identify candidate query terms that may be useful to suggest for modifying the query "Halloween" 812 within the query input user interface 806 of the search user interface 804 for the file user interface 801. For example, a candidate query term "monster outfit" 820 may be identified within the Halloween party email 816. A visually formatting may be applied to the candidate query term "monster outfit" 820, such as a bold and underline format. In this way, the user may interface 818 with objects to create a new query, replace the query "Halloween" 812, or modify the query "Halloween" 812.

Figure 8B:
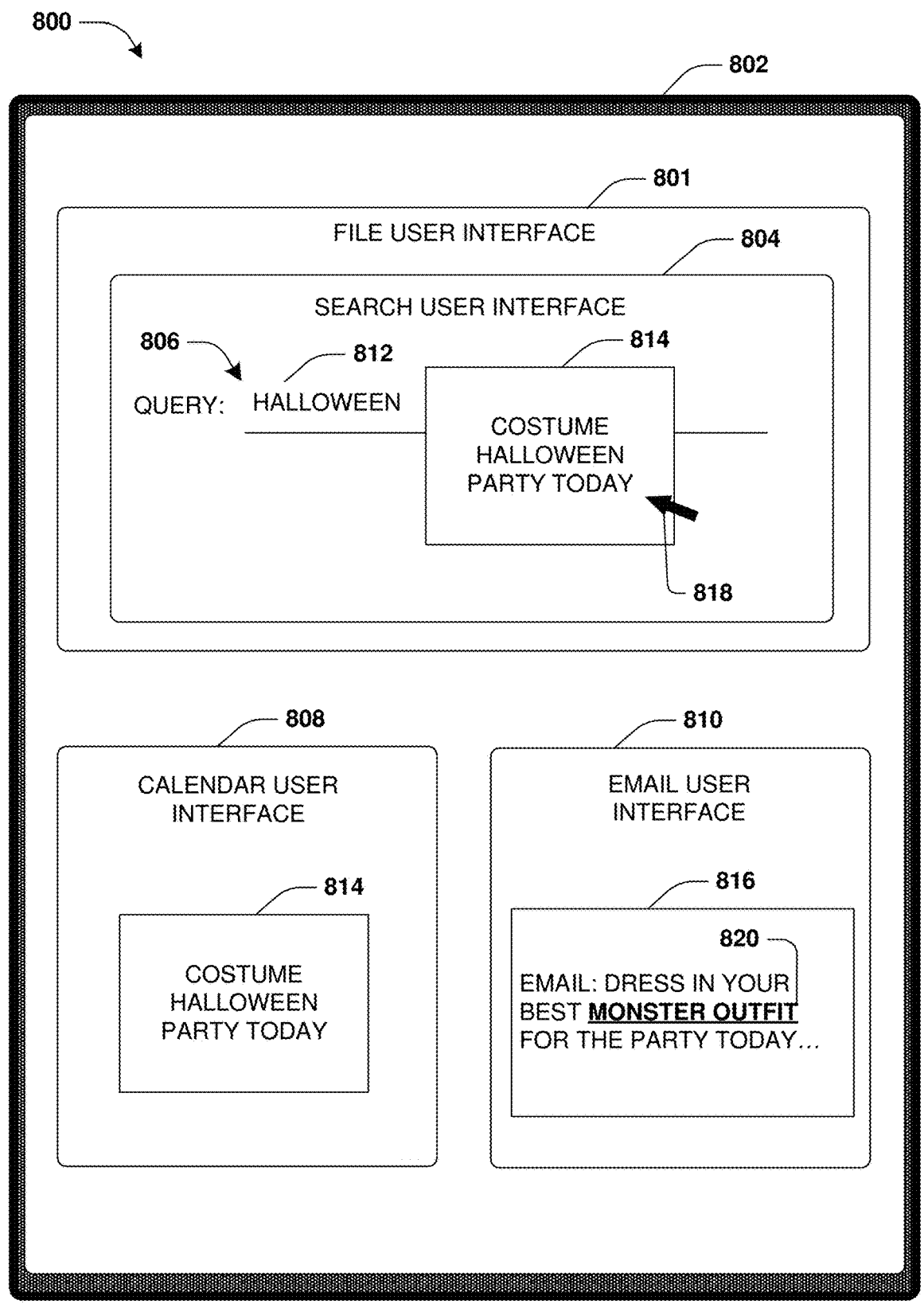
FIG. 8B is a component block diagram illustrating an example system for query expansion, where a query is modified using an object.
Figure 8C:
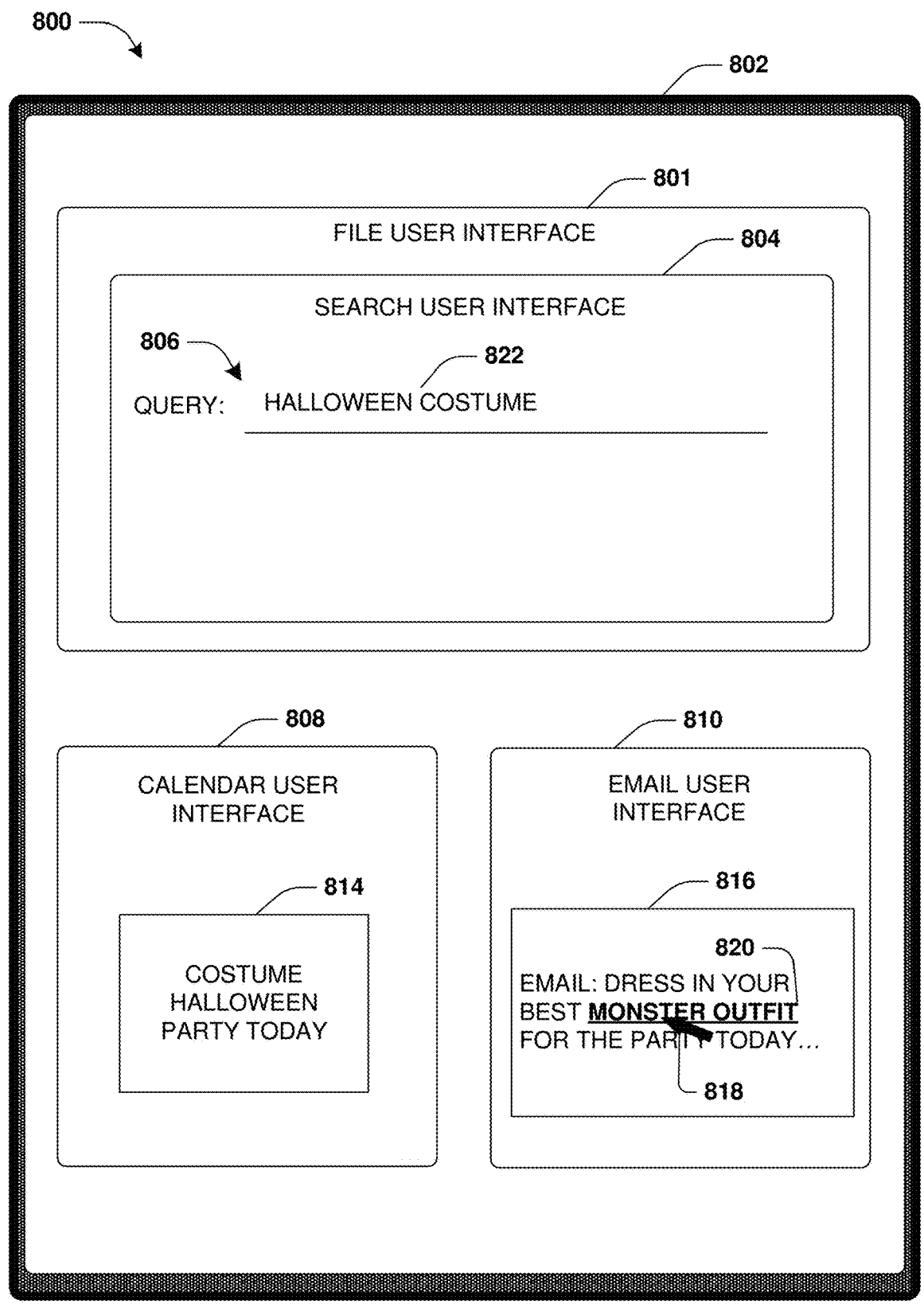
FIG. 8C is a component block diagram illustrating an example system for query expansion, where a modified query is displayed.

FIG. 8B illustrates the user dragging and dropping the Halloween party calendar entry 814 from the calendar user interface 808 to the query input user interface 806. Accordingly, the query "Halloween" 812 is modified using the Halloween party calendar entry 814, such as by adding the term "costume" from within the Halloween party calendar entry 814 (e.g., "costume" may be a candidate query term, the user may select the term "costume" from the Halloween party calendar entry 814, etc.), to create a modified query "Halloween costume" 822, as illustrated by FIG. 8C. The modified query "Halloween costume" 822 may be populated within the query input user interface 806.

Figure 8D:
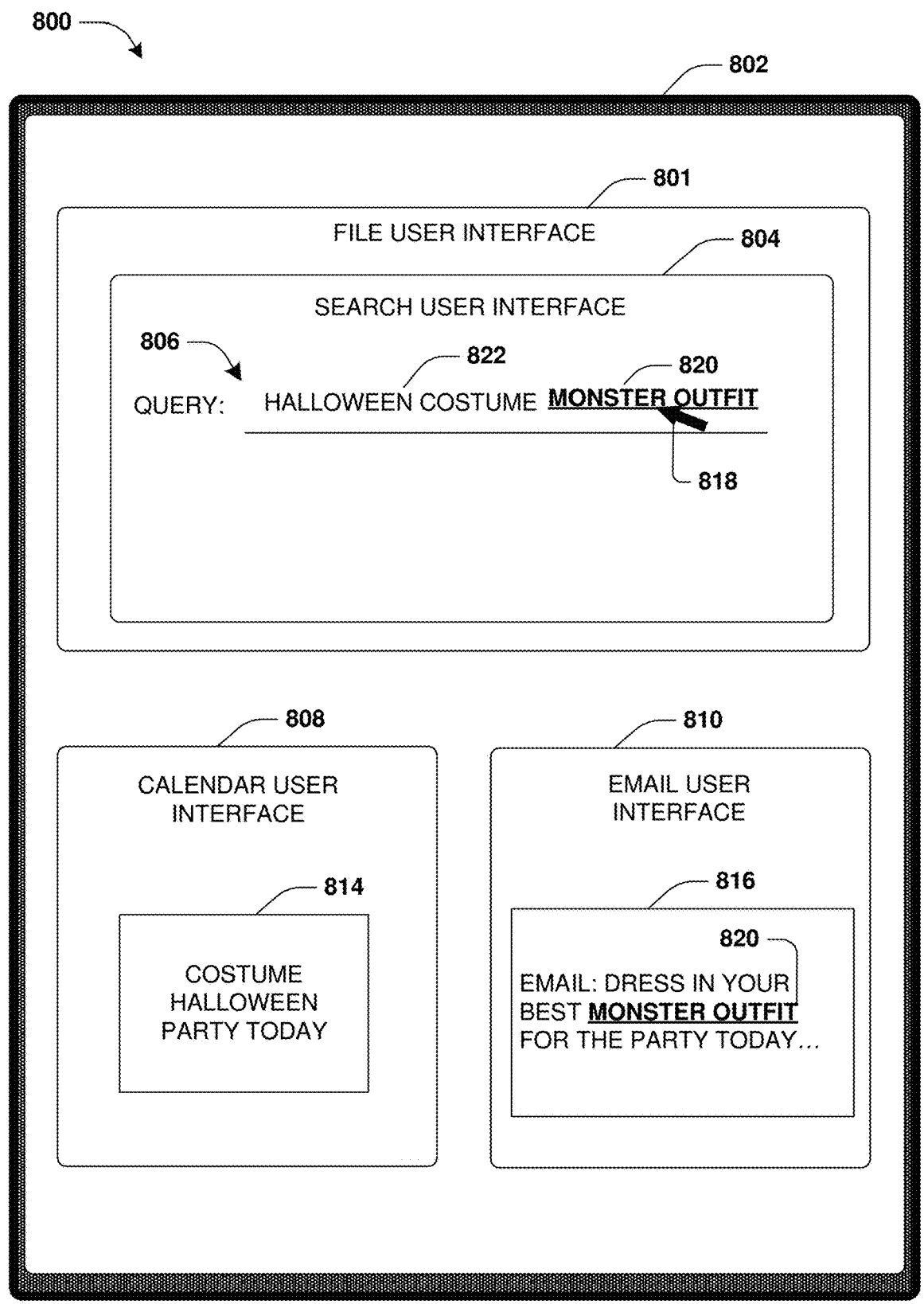
FIG. 8D is a component block diagram illustrating an example system for query expansion, where a modified query is modified using a second object.
Figure 8E:
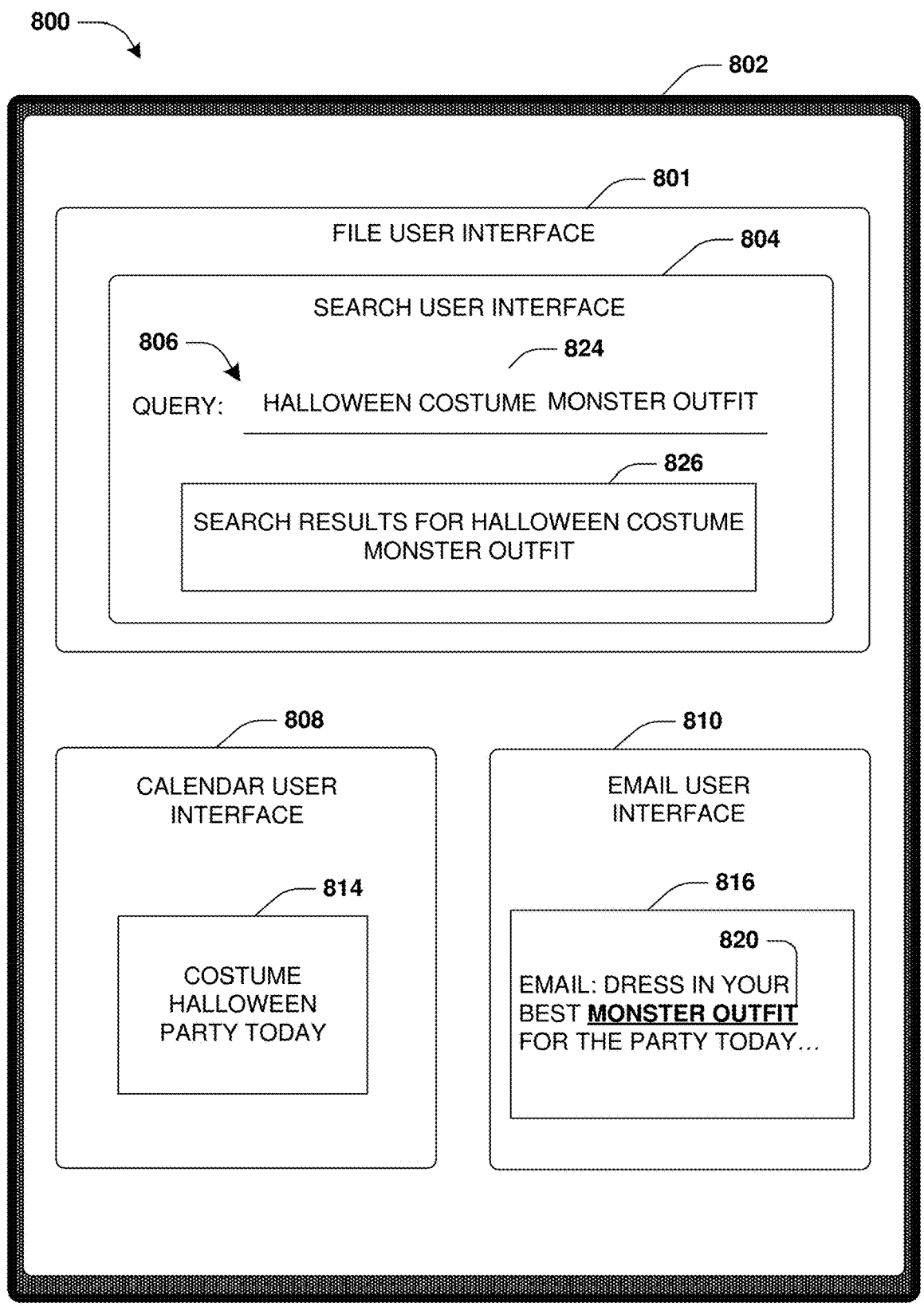
FIG. 8E is a component block diagram illustrating an example system for query expansion, where second search results are provided.

The user may interface 818 with the candidate query term "monster outfit" 820 within the Halloween party email 816 rendered through the email user interface 810. For example, the user may drag and drop the candidate query term "monster outfit" 820 from the Halloween party email 816 within the email user interface 810 to the query input user interface 806, as illustrated by FIG. 8D. Accordingly, the modified query "Halloween costume" 822 may be further modified using the candidate query term "monster outfit" 820 to create an updated modified query "Halloween costume monster outfit" 824. The updated modified query "Halloween costume monster outfit" 824 may be populated within the query input user interface 806 of the file user interface 801, as illustrated by FIG. 8E. The updated modified query "Halloween costume monster outfit" 824 may be submitted by the user through the search user interface 804 of the file user interface 801 to perform a search for files corresponding to the updated modified query "Halloween costume monster outfit" 824. In this way, search results 826 for the updated modified query "Halloween costume monster outfit" 824 are rendered through the search user interface 804 of the file user interface 801.

Figure 9:
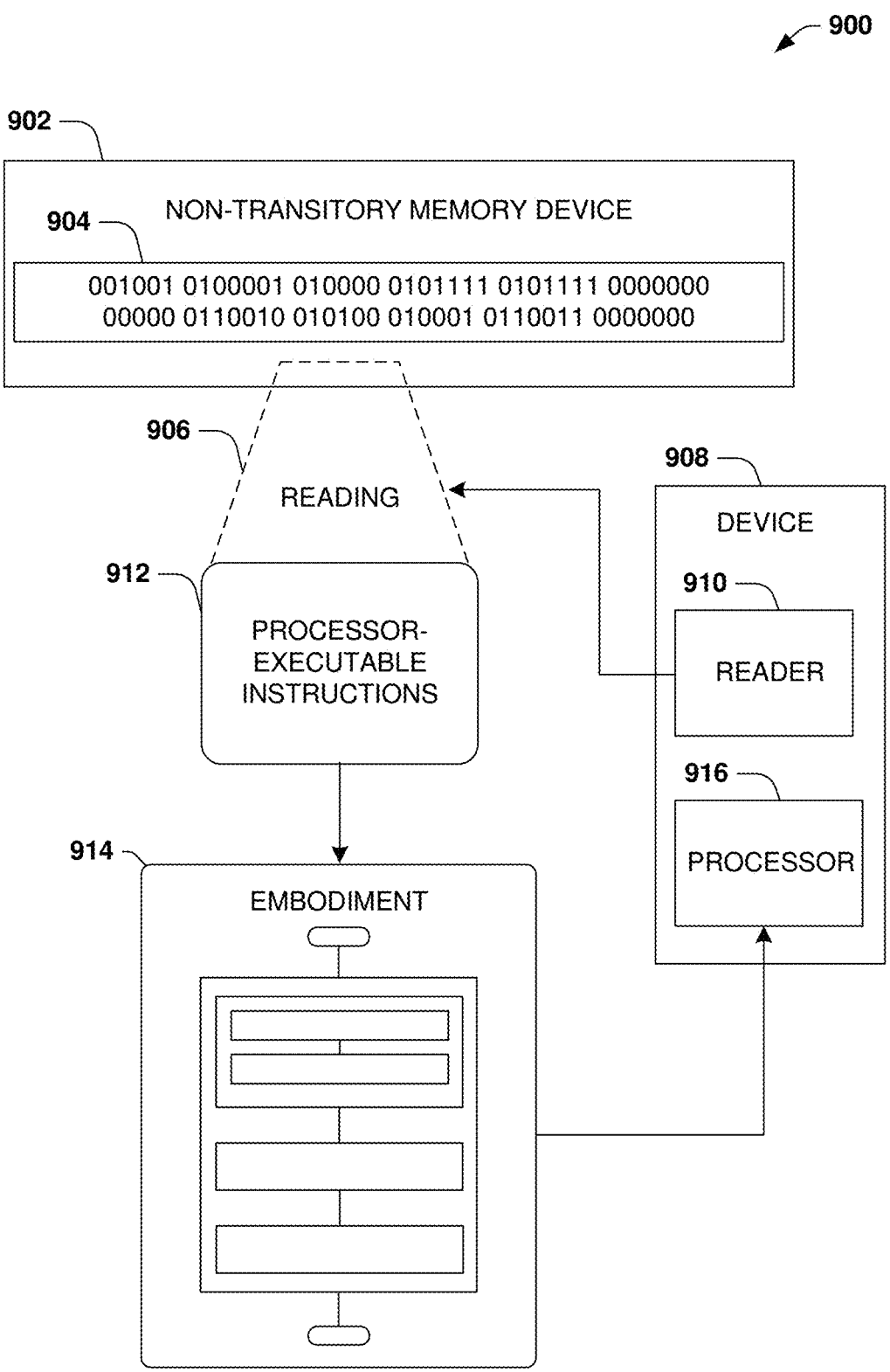
FIG. 9 is an illustration of a scenario featuring an example non-transitory machine readable medium in accordance with one or more of the provisions set forth herein.

FIG. 9 is an illustration of a scenario 900 involving an example non-transitory machine readable medium 902. The non-transitory machine readable medium 902 may comprise processor-executable instructions 912 that when executed by a processor 916 cause performance (e.g., by the processor 916) of at least some of the provisions herein. The non-transitory machine readable medium 902 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 902 stores computer-readable data 904 that, when subjected to reading 906 by a reader 910 of a device 908 (e.g., a read head of a hard disk drive, or a read operation invoked on a solid-state storage device), express the processor-executable instructions 912. In some embodiments, the processor-executable instructions 912, when executed cause performance of operations, such as at least some of the example method 400 of FIG. 4, for example. In some embodiments, the processor-executable instructions 912 are configured to cause implementation of a system, such as at least some of the example system 500 of FIGS. 5A-5B, at least some of the example system 600 of FIGS. 6A-6C, at least some of the example system 700 of FIGS. 7A-7C, and/or at least some of the example system 800 of FIGS. 8A-8E, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of search query expansion, the method comprising:
    executing, on a processor of a computing device, instructions that cause the computing device to perform operations, the operations comprising:
        receiving a query submitted through the computing device;
        responsive to receiving the query, concurrently rendering, on a display of the computing device:
            a query input user interface;
            a first user interface populated with one or more first search results of the query associated with a first data source; and
            a second user interface populated with one or more second search results of the query associated with a second data source,
            wherein the one or more first search results populated in the first user interface comprise a first search result, comprising a first object, identified based upon the query,
            wherein the one or more second search results populated in the second user interface comprise a second search result, comprising a second object, identified based upon the query,
            wherein the first search result comprises a first description of the first object and the second search result comprises a second description of the second object;
        receiving user input through the first user interface associated with the first data source comprising a drag and drop command dragging first text from the first description in the first search result populated in the first user interface to the query input user interface, wherein the user input is received while the first user interface populated with the first search result and the second user interface populated with the second search result are rendered on the display;
        modifying the query using the first text to create a modified query;
        receiving second user input through the second user interface associated with the second data source comprising a second drag and drop command dragging second text from the second description in the second search result populated in the second user interface to the same query input user interface to which the first text from the first description in the first search result populated in the first user interface associated with the first data source was dragged, wherein the second user input is received while the first user interface populated with the first search result and the second user interface populated with the second search result are rendered on the display; and
        modifying the modified query using the second text to create a second modified query.

2. The method of claim 1, the operations comprising:
    rendering, on the display of the computing device, second search results based upon the modified query.

3. The method of claim 1, the operations comprising:
    receiving a third drag and drop command of an image from a third search result populated within at least one of the first user interface associated with the first data source or the second user interface associated with the second data source, wherein the third drag and drop command drags the image from the second search result to the query input user interface.

4. The method of claim 3, wherein the modifying comprises:
    determining a topic of the image; and
    using the topic to modify the query.

5. The method of claim 1,
    wherein the first user interface comprises a first calendar user interface and the first object comprises a first calendar entry; and
    at least one of:
        wherein the second user interface comprises a first email user interface and the second object comprises at least one of a first email or a first email attachment;
        wherein the second user interface comprises a first file system user interface and the second object comprises a first file;
        wherein the second user interface comprises a first social network user interface and the second object comprises a first social network post; or
        wherein the second user interface comprises a first search user interface and the second object comprises a third search result.

6. The method of claim 1,
    wherein the first user interface comprises a first email user interface and the second object comprises at least one of a first email or a first email attachment; and
    at least one of:
        wherein the second user interface comprises a first calendar user interface and the first object comprises a first calendar entry;
        wherein the second user interface comprises a first file system user interface and the second object comprises a first file;
        wherein the second user interface comprises a first social network user interface and the second object comprises a first social network post; or
        wherein the second user interface comprises a first search user interface and the second object comprises a third search result.

7. The method of claim 1,
    wherein the first user interface comprises a first file system user interface and the second object comprises a first file; and
    at least one of:

wherein the second user interface comprises a first email user interface and the second object comprises at least one of a first email or a first email attachment;
wherein the second user interface comprises a first calendar user interface and the first object comprises a first calendar entry;
wherein the second user interface comprises a first social network user interface and the second object comprises a first social network post; or
wherein the second user interface comprises a first search user interface and the second object comprises a third search result.

8. The method of claim 1,
wherein the first user interface comprises a first social network user interface and the second object comprises a first social network post; and
at least one of:
wherein the second user interface comprises a first email user interface and the second object comprises at least one of a first email or a first email attachment;
wherein the second user interface comprises a first file system user interface and the second object comprises a first file;
wherein the second user interface comprises a first calendar user interface and the first object comprises a first calendar entry; or
wherein the second user interface comprises a first search user interface and the second object comprises a third search result.

9. The method of claim 1,
wherein the first user interface comprises a first search user interface and the second object comprises a third search result; and
at least one of:
wherein the second user interface comprises a first email user interface and the second object comprises at least one of a first email or a first email attachment;
wherein the second user interface comprises a first file system user interface and the second object comprises a first file;
wherein the second user interface comprises a first social network user interface and the second object comprises a first social network post; or
wherein the second user interface comprises a first calendar user interface and the first object comprises a first calendar entry.

10. A computing device comprising:
a processor; and
memory comprising processor-executable instructions that when executed by the processor cause performance of operations, the operations comprising:
receiving a query submitted through the computing device;
obtaining search results for the query;
evaluating the search results to identify candidate query objects within the search results;
applying a visual format to the candidate query objects within the search results to visually distinguish the candidate query objects from non-candidate query objects within the search results,
wherein a description of a first search result of the search results of the query concurrently comprises both:
a candidate query object of the candidate query objects, wherein a term of the candidate query object is different than each term of the query; and
a non-candidate query object of the non-candidate query objects, wherein applying the visual format to the candidate query object of the description of the first search result visually distinguishes the candidate query object of the description of the first search result from the non-candidate query object of the description of the first search result;
rendering, on a display of the computing device, a query input user interface and the search results within a search user interface, wherein the search results within the search user interface comprise the first search result and a second search result of the query;
receiving user input through the search user interface comprising a drag and drop command dragging the candidate query object from the first search result within the search user interface on the display to the query input user interface, wherein the user input is received while the search user interface comprising the first search result and the second search result is rendered on the display;
modifying the query using the candidate query object to create a modified query; and
rendering, on the display of the computing device, second search results for the modified query.

11. The computing device of claim 10, wherein the operations comprise:
identifying the candidate query objects based upon prevalence of objects within the search results being within a first percentage of scored search results compared to prevalence of objects being within a second percentage of scored search results.

12. The computing device of claim 10, wherein the description of the first search result of the search results of the query comprises:
a second candidate query object of the candidate query objects, wherein a term of the second candidate query object is different than each term of the query and is different than the term of the candidate query object, wherein applying the visual format to the second candidate query object of the description of the first search result visually distinguishes the second candidate query object of the description of the first search result from the non-candidate query object of the description of the first search result.

13. The computing device of claim 10, wherein the operations comprise:
clustering the search results into clusters;
evaluating the clusters to assign ranks to objects within the search results of the clusters, wherein a rank corresponds to an amount an object of a search result represents a sub-topic or meaning of the query; and
identifying the candidate query objects based upon the ranks.

14. The computing device of claim 10, wherein the operations comprise:
clustering the search results into clusters;
evaluating the clusters to assign ranks to objects within the search results of the clusters, wherein a rank corresponds to an amount an object of a search result differentiates from a sub-topic or meaning of other search results; and
identifying the candidate query objects based upon the ranks.

15. A non-transitory machine readable medium having stored thereon processor-executable instructions that when executed cause performance of operations, the operations comprising:
receiving a query submitted through a computing device;
responsive to receiving the query, concurrently rendering, on a display of the computing device:
a query input user interface;
a first user interface populated with one or more first search results of the query; and
a second user interface populated with one or more second search results of the query,
wherein the one or more first search results populated in the first user interface comprise a first search result, comprising a first object, of the query,
wherein the one or more second search results populated in the second user interface comprise a second search result, comprising a second object, of the query;
receiving user input comprising a drag and drop command dragging at least some of the first object from the first search result populated in the first user interface to the query input user interface, wherein the user input is received while the first user interface populated with the first search result and the second user interface populated with the second search result are rendered on the display;
modifying the query using the at least some of the first object to create a modified query;
receiving second user input comprising a second drag and drop command dragging at least some of the second object from the second search result populated in the second user interface to the same query input user interface to which at least some of the first object in the first search result populated in the first user interface was dragged, wherein the second user input is received while the first user interface and the second user interface are rendered on the display; and
modifying the modified query using the at least some of the second object to create a second modified query.

16. The non-transitory machine readable medium of claim 15, wherein the operations comprise:
rendering, on the display of the computing device, second search results based upon the modified query.

17. The non-transitory machine readable medium of claim 15,
wherein the first user interface comprises a first calendar user interface and the first object comprises a first calendar entry; and
at least one of:
wherein the second user interface comprises a first email user interface and the second object comprises at least one of a first email or a first email attachment;
wherein the second user interface comprises a first file system user interface and the second object comprises a first file; or
wherein the second user interface comprises a first social network user interface and the second object comprises a first social network post.

18. The non-transitory machine readable medium of claim 15,
wherein the first user interface comprises a first email user interface and the first object comprises at least one of a first email or a first email attachment; and
at least one of:
wherein the second user interface comprises a first calendar user interface and the second object comprises a first calendar entry;
wherein the second user interface comprises a first file system user interface and the second object comprises a first file; or
wherein the second user interface comprises a first social network user interface and the second object comprises a first social network post.

19. The non-transitory machine readable medium of claim 15,
wherein the first user interface comprises a first file system user interface and the first object comprises a first file; and
at least one of:
wherein the second user interface comprises a first calendar user interface and the second object comprises a first calendar entry;
wherein the second user interface comprises a first email user interface and the second object comprises at least one of a first email or a first email attachment; or
wherein the second user interface comprises a first social network user interface and the second object comprises a first social network post.

20. The non-transitory machine readable medium of claim 15,
wherein the first user interface comprises a first social network user interface and the first object comprises a first social network post; and
at least one of:
wherein the second user interface comprises a first calendar user interface and the second object comprises a first calendar entry;
wherein the second user interface comprises a first email user interface and the second object comprises at least one of a first email or a first email attachment; or
wherein the second user interface comprises a first file system user interface and the second object comprises a first file.

* * * * *